United States Patent
Yan et al.

(10) Patent No.: US 8,227,562 B2
(45) Date of Patent: Jul. 24, 2012

(54) FUNCTIONALIZED POLYMERS AND INITIATORS FOR MAKING SAME

(75) Inventors: Yuan-Yong Yan, Copley, OH (US); Michael W. Hayes, Canton, OH (US)

(73) Assignee: Bridgestone Corporation, Tokyo (JP)

( * ) Notice: Subject to any disclaimer, the term of this patent is extended or adjusted under 35 U.S.C. 154(b) by 29 days.

(21) Appl. No.: 12/922,611

(22) PCT Filed: Mar. 15, 2009

(86) PCT No.: PCT/US2009/037211
§ 371 (c)(1),
(2), (4) Date: Sep. 17, 2010

(87) PCT Pub. No.: WO2009/117329
PCT Pub. Date: Sep. 24, 2009

(65) Prior Publication Data
US 2011/0009583 A1      Jan. 13, 2011

Related U.S. Application Data

(60) Provisional application No. 61/036,940, filed on Mar. 15, 2008.

(51) Int. Cl.
*C08F 36/04* (2006.01)
*C08F 4/48* (2006.01)
*C08F 8/42* (2006.01)

(52) U.S. Cl. ........ 526/335; 526/176; 526/178; 526/179; 526/180; 526/217; 526/220; 526/340; 525/106; 525/332.3; 525/332.9; 525/342; 525/370; 525/375; 525/379; 525/382; 525/383

(58) Field of Classification Search .................. 526/180, 526/217, 220, 335, 340, 176, 178, 179; 525/106, 525/332.3, 332.9, 342, 370, 375, 379, 382, 525/383
See application file for complete search history.

(56) References Cited

U.S. PATENT DOCUMENTS

| | | | |
|---|---|---|---|
| 4,935,471 A | 6/1990 | Halasa et al. | |
| 5,149,457 A | 9/1992 | Smith | |
| 5,196,138 A | 3/1993 | Smith, Jr. | |
| 5,329,005 A | 7/1994 | Lawson et al. | |
| 5,496,940 A | 3/1996 | Lawson et al. | |
| 5,578,542 A * | 11/1996 | Lawson et al. | 502/167 |
| 5,610,227 A | 3/1997 | Antkowiak et al. | |
| 5,643,848 A * | 7/1997 | Lawson et al. | 502/167 |
| 5,663,398 A | 9/1997 | Schwindeman et al. | |
| 5,723,533 A * | 3/1998 | Lawson et al. | 524/572 |
| 5,866,650 A | 2/1999 | Lawson et al. | |
| 5,959,048 A * | 9/1999 | Lawson et al. | 526/180 |
| 6,812,295 B2 | 11/2004 | Schwindeman et al. | |
| 6,943,250 B2 | 9/2005 | Brockmann | |
| 6,977,281 B1 | 12/2005 | Ozawa et al. | |

FOREIGN PATENT DOCUMENTS

EP      0693505 A1      1/1996

OTHER PUBLICATIONS

D.F. Lawson et al., "Anionic Polymerization of Dienes Using Homogenous Lithium Amide (N-Li) Initiators, and Determination of Polymer-Bound Amines," *Applications of Anionic Polymerization Research*, ACS Symposium Series, vol. 696, 1998, pp. 77-87 (American Chemical Society; Washington, DC).

* cited by examiner

*Primary Examiner* — Fred M Teskin
(74) *Attorney, Agent, or Firm* — Meredith E. Hooker; David G. Burleson

(57) ABSTRACT

A polymer includes at a terminus a cyclic amine radical bonded to the polymer through a ring nitrogen atom. The polymer can be provided by using a lithiated version of the cyclic amine to initiate polymerization of one or more ethylenically unsaturated monomers. The polymer can be used in the production in a variety of vulcanizates.

18 Claims, No Drawings

FUNCTIONALIZED POLYMERS AND INITIATORS FOR MAKING SAME

CROSS-REFERENCE TO RELATED APPLICATION

This application is the National Stage of International Application No. PCT/US09/37211 filed 15 Mar. 2009, which claims the benefit of U.S. provisional application No. 61/036,940, filed 15 Mar. 2008, both of which is incorporated herein by reference in their entirety.

BACKGROUND INFORMATION

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa. Tread compositions typically contain one or more elastomers and one or more types of reinforcing materials such as particulate carbon black and silica; see, e.g., The Vanderbilt Rubber Handbook, 13th ed. (1990), pp. 603-04.

Filler(s), polymer(s), and additives typically are chosen so as to provide an acceptable compromise or balance of the desired properties. Ensuring that reinforcing filler(s) are well dispersed throughout the elastomeric material(s) both enhances processability and acts to improve physical properties. Dispersion of filler particles can be improved by increasing their interaction with the elastomer(s) and/or decreasing their interaction with each other. Examples of efforts of this type include high temperature mixing in the presence of selectively reactive promoters, surface oxidation of compounding materials, surface grafting, and chemically modifying the polymer, typically at a terminus thereof.

Terminal chemical modification often occurs by reaction of a living polymer with a functional terminating agent. Some of the numerous examples of this approach include U.S. Pat. Nos. 3,109,871, 4,647,625, 4,677,153, 5,109,907, 6,977,281, etc., as well as references cited therein and later publications citing these patents.

Terminal modification also can be provided by means of a functional initiator, in isolation or in combination with functional termination. Functional initiators typically are organolithium compounds that additionally include functionality, typically functionality that includes a nitrogen atom, capable of interacting with one or more types of particulate filler materials.

Functional initiators generally have relatively poor solubility in hydrocarbon solvents of the type commonly used in anionic (living) polymerizations. Further, many functional initiators also do not maintain propagation of living ends as well as more common alkyllithium initiators such as butyllithium. Both of these characteristics can negatively impact polymerization rate and efficiency

SUMMARY

In one aspect is provided a polymer that includes the radical of a cyclic moiety at a terminus of the polymer. The radical is bonded to the polymer through a ring nitrogen atom, and the at least one other ring atom is bonded to a substituted or unsubstituted alkyl, aryl, aralkyl, alkaryl, or cycloalkyl group (with "substituted" meaning that the group contains a heteroatom or substituent that does not interfere with the intended purpose or functionality of the group and/or overall moiety) that is free of active hydrogen atoms. The ring atom can be N, P, C, Si or Sn and, where it something other than N, the bonded group includes at least one N, P, O, S, Si or Sn atom. Piperazines having a ring nitrogen atom bonded to the type of group just described constitute an exemplary class of cyclic compounds.

In another aspect is provided a polymer that includes a terminal moiety defined by

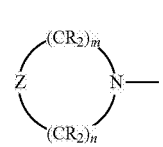

(Ia)

where each R independently is H or a $C_1$-$C_6$ alkyl group; m is an integer of from 0 to 4 inclusive and n is an integer of from 1 to 4 inclusive, with the proviso that m+n≧2; and Z is $NR^1$, $PR^2$, $SiR^2R^3$, $SnR^2R^3$, or $CR^2R^4$ wherein $R^1$ is a substituted or unsubstituted alkyl, aryl, aralkyl, alkaryl or cycloalkyl group that is free of active hydrogen atoms, $R^2$ is an $R^1$ group which includes at least one N, P, O, S, Si or Sn atom, $R^3$ is a $C_1$-$C_6$ alkyl group, and $R^4$ is R or, together with $R^2$ and the C atom to which it is bonded, forms a substituted or unsubstituted cycloalkyl group that includes at least one N, P, O, S, Si or Sn atom. While not mandatory, $R^1$ also can include one or more N, P, O, S, Si or Sn atoms. An exemplary subset of terminal moieties defined by formula (Ia) can be represented by

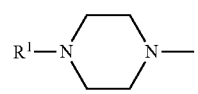

(Ib)

where $R^1$ is defined as above.

In each of the foregoing aspects, a lithiated cyclic compound, such as a piperazine, can be used to initiate polymerization of unsaturated monomers so as to form a living polymer, typically one that includes polyene mer units, optionally further including vinyl aromatic mer. In certain embodiments, the polyenes can be conjugated dienes, and the resulting conjugated diene mer can incorporated substantially randomly along the polymer chain. In these and other embodiments, the polymer can be substantially linear.

The polymer can interact with particulate filler such as, e.g., carbon black. Compositions, including vulcanizates, that include particulate fillers and such polymers also are provided, as are methods of providing and using such compositions. Methods of providing the polymer, regardless of how characterized, also are provided.

Other aspects of the present invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetrapolymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"radical" means the portion of a molecule that remains after reacting with another molecule, regardless of whether any atoms are gained or lost as a result of the reaction;

"terminus" means an end of a polymeric chain; and

"terminal moiety" means a group or functionality located at a terminus.

Throughout this document, all values given in the form of percentages are weight percentages unless the surrounding text explicitly indicates a contrary intention. The relevant teachings of all patent documents mentioned throughout are incorporated herein by reference.

DETAILED DESCRIPTION

As apparent from the foregoing, the polymer can be described or characterized in a variety of ways. Generally, it includes a terminal moiety defined by formula (Ia).

The polymer can be provided by using a lithiated cyclic compound that includes at least one nitrogen atom, such as a piperazine, to initiate anionic (living) polymer polymerization of one or more types of unsaturated monomers. Particularly where the resulting polymer is intended for tire applications, the polymer can include diene mer units, particularly conjugated diene mer, and optionally vinyl aromatic mer units.

The polymer can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Polyenes can incorporate into polymeric chains in more than one way. Especially for tire tread applications, controlling this manner of incorporation can be desirable; techniques for achieving this control are discussed below. A polymer chain with an overall 1,2-microstructure, given as a numerical percentage based on total polyene content, of from about 10 to about 80%, optionally from about 25 to 65%, can be desirable for certain end use applications. A polymer that has an overall 1,2-microstructure of no more than about 50%, preferably no more than about 45%, more preferably no more than about 40%, even more preferably no more than about 35%, and most preferably no more than about 30%, based on total polyene content, is considered to be "substantially linear".

Directly bonded pendent aromatic groups can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1 to about 50%, from about 10 to about 45%, or from about 20 to about 35%, of the polymer chain; the microstructure of such interpolymers can be random, i.e., the mer units derived from each type of constituent monomer do not form blocks and, instead, are incorporated in a non-repeating, essentially simultaneous manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The number average molecular weight ($M_n$) of the polymer typically is such that a quenched sample exhibits a gum Mooney viscosity ($ML_4$/100° C.) of from ~2 to ~150, more commonly from ~2.5 to ~125, even more commonly from ~5 to ~100, and most commonly from ~10 to ~75.

Elastomers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Both polar solvents, such as THF, and non-polar solvents can be employed in anionic polymerization techniques, with the latter type being more common in industrial practice. Examples of non-polar solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

Most solution-type anionic polymerizations employ an alkyllithium initiator, such as n-butyllithium, a so-called multifunctional initiators which is capable of forming polymers with more than one living end, or a functionalized initiator of the type described previously. Many functionalized initiators are poorly soluble in the types of solvents set forth above.

However, lithiated cyclic compounds having the general formula

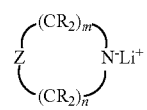

(II)

where R, m, n and Z are defined as above exhibit generally acceptable solubility in the types of organic liquids commonly employed as solvents in solution polymerizations. Lithiated compounds defined by formula (II) can be provided by introducing a cyclic compound of the general formula

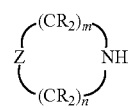

(III)

(where R, m, n and Z are defined as above), to a source of Li ions, which can be accomplished by introducing an organolithium, typically an alkyllithium, to the appropriate cyclic compound in an appropriate solvent. This can be done external to the polymerization vessel or, more commonly, in situ (i.e., in the polymerization vessel) at the time of or just prior to use as an initiator. To some extent, the solvent(s) in which the cyclic compound is soluble can influence the method by which the lithiated version is synthesized.

In formulas (II) and (III), Z can be defined by (1) $NR^1$, where $R^1$ is a substituted or unsubstituted alkyl, aryl, aralkyl, alkaryl or cycloalkyl group that is free of active hydrogen atoms and, optionally, includes one or more N, P, O, S, Si or Sn atoms; (2) $PR^2$, where $R^2$ is an $R^1$ group which includes at least one N, P, O, S, Si or Sn atom; (3) $SiR^2R^3$ or $SnR^2R^3$, where $R^2$ is the same as in connection with $PR^2$ and $R^3$ is a $C_1$-$C_6$ alkyl group; and (4) $CR^2R^4$, where $R^2$ is the same as in connection with $PR^2$ and $R^4$ can be R or, together with $R^2$ and the C atom to which it is bonded, can form a substituted or unsubstituted cycloalkyl group that includes at least one N, P, O, S, Si or Sn atom. Where Z is $NR^1$, the N atom of the $NR^1$ moiety is considered to be a tertiary amine, i.e., bonded to three C atoms, two of which constitute part of the ring, while the other constitutes part of the functionality represented by $R^1$. Regardless of the nature of Z, the ring N atom of formula (III) can be considered part of a secondary amine, the H atom of which constitutes the only active hydrogen atom of the compound, thereby controlling the location of the anionic charge when the compound is exposed to a source of Li ions.

Included within the group of compounds defined by formula (III) are piperazines represented by the general formula

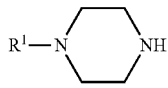

(IV)

where $R^1$ is defined as above. Within the many compounds defined by formula (IV) are those where $R^1$ represents a $C_1$-$C_{20}$, preferably $C_1$-$C_{10}$, alkyl radical such as a methyl, ethyl, propyl, n-butyl, etc., group or a substituted $C_1$-$C_{20}$, preferably $C_1$-$C_{10}$, alkyl radical such as an alkoxyalkyl group (e.g., methoxyethyl, ethoxyethyl, propoxyethyl, etc.), an aminoalkyl group (e.g., 3-(dimethylamino)propyl, 2-(dimethylamino)ethyl, etc.), and the like;

a substituted or unsubstituted aryl group, specific examples of which include

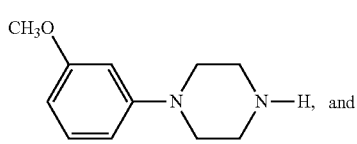

(IVa)

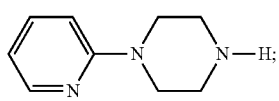

(IVb)

a substituted or unsubstituted alkaryl group, specific examples of which include

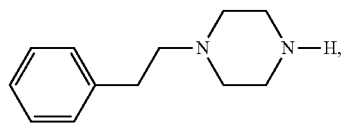

(IVc)

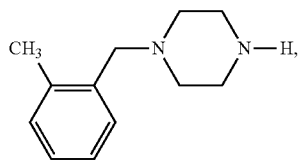

(IVd)

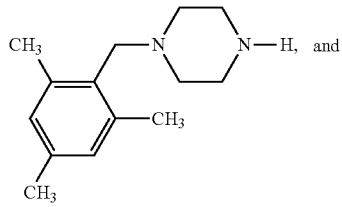

(IVe)

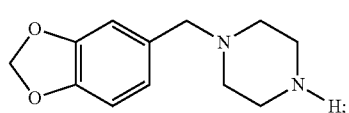

(IVf)

or a substituted or unsubstituted cycloalkyl group, specific examples of which include

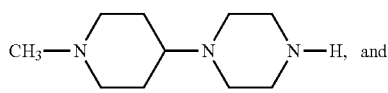

(IVg)

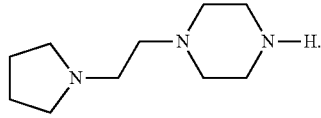

(IVh)

Also included within the group of compounds defined by formula (III) are those where Z is $CR^2R^4$. Within this subset are those where m is 0 and n is 3 or m is 1 and n is 2 (i.e., pyrrolidines), those where m and n both are 2 (i.e., piperidines), those where $R^4$ is R, and those where $R^4$ together with $R^2$ and the C atom to which each is bonded form a substituted or unsubstituted cycloalkyl group that includes at least one N, P, O, S, Si or Sn atom. These compounds can be represented by the general formulas

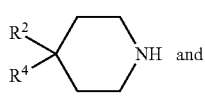

(V-1)

(V-2)

specific non-limiting examples of which include

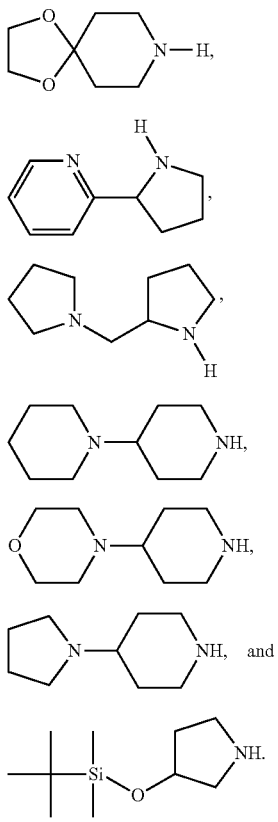

(Va)

(Vb)

(Vc)

(Vd)

(Ve)

(Vf)

(Vg)

From the specific compounds exemplified for general formulas (IV), (V-1) and (V-2), the ordinarily skilled artisan can envision a significant number of analogs and additional species defined by formula (III) where Z is other than $NR^1$ or $CR^2R^4$.

The following representative description of a solution polymerization is based on a batch process, although extending this description to, e.g., semi-batch or continuous processes is within the capability of the ordinarily skilled artisan.

If a lithiated initiator defined by formula (II) is made external to the polymerization vessel, a blend of monomer(s) and solvent can be charged to the reaction vessel, followed by addition of initiator, which often are added as part of a solution or blend (i.e., in a solvent carrier).

Where initiator is synthesized in situ, monomer(s) can be added to the vessel before or after formation of the desired initiator. Typically, a solution of polymerization solvent(s) and the monomer(s) is provided at a temperature of from about −80° to ~100° C., more commonly from about −40° to ~50° C., and typically from ~0° to ~30° C.; to this solution, the desired substituted cyclic compound(s) and organolithium, typically alkyllithium, compound(s) are added. The solution then can be heated to a temperature of from about −70° to ~150° C., more commonly from about −20° to ~120° C., and typically from ~50° to ~100° C., and the polymerization allowed to proceed for a period of time sufficient to result in the formation of the desired functional polymer, usually from ~0.01 to ~100 hours, more commonly from ~0.08 to ~48 hours, and typically from ~0.15 to ~2 hours. The foregoing reaction times and temperatures can be varied as necessary to allow formation of the lithiated initiator (formula II) and subsequent polymerization of the various monomer(s).

Both randomization and vinyl content (i.e., 1,2-microstructure) of the polymer product can be increased by including a coordinator, usually a polar compound, in the polymerization ingredients; such a coordinator can be added separately, with one or more of the monomer(s), or with the initiator (if made outside of the polymerization vessel). Compounds useful as coordinators include organic compounds that include a heteroatom having a non-bonded pair of electrons (e.g., O or N), examples of which include dialkyl ethers of mono-and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like. Up to 90 or more equivalents of coordinator can be used per equivalent of initiator, depending on, for example, the amount of vinyl content desired, the level of non-polyene monomer employed, the reaction temperature, and nature of the specific coordinator employed.

Anionic polymerizations typically are carried out under anhydrous, anaerobic conditions. The reactants can be heated to a temperature of up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

The polymer is considered to include terminal functionality from the functional initiator, for example,

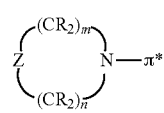

(VIa)

or, in the specific case of a piperazine initiator,

(VIb)

where π* represents a living polymer chain and the other variables are defined as above. However, where additional or other functionality is desired to enhance interaction with particulate filler, the polymer can be further functionalized by reaction with an appropriate terminating reagent, coupling agent and/or linking agent. The ordinarily skilled artisan is familiar with numerous examples of terminal functionalities that can be provided through this type of post-polymerization functionalization. For additional details, the interested reader is directed to any of U.S. Pat. Nos. 4,015,061, 4,616,069, 4,935,471, 5,153,159, 5,149,457, 5,196,138, 5,329,005, 5,496,940, 5,502,131, 5,567,815, 5,610,227, 5,663,398, 5,786,441, 6,812,295, 7,153,919, etc., as well as references cited in these patents and later publications citing these patents; see also U.S. Patent Publ. Nos. 2007/0149744, 2007/

0037956, 2007/0078232, 2008/0027171, and the like. Specific exemplary functionalizing compounds include $SnCl_4$, $R^2{}_3SnCl_2$, $R^2{}_2SnCl_2$, $R^2SnCl_3$, carbodiimides, N-cyclic amides, N,N'-disubstituted cyclic ureas, cyclic amides, cyclic ureas, isocyanates, Schiff bases, 4,4'-bis(diethylamino) benzophenone, alkyl thiothiazolines, alkoxysilanes (e.g., $Si(OR^2)_4$, $R^2Si(OR^2)_3$, $R^2{}_2Si(OR^2)_2$, etc.) cyclic siloxanes and mixtures thereof (In the foregoing, each $R^2$ independently is a $C_1$-$C_{20}$ alkyl group, $C_3$-$C_{20}$ cycloalkyl group, $C_6$-$C_{20}$ aryl group, or $C_7$-$C_{20}$ aralkyl group.) Specific examples of preferred functionalizing compounds include $SnCl_4$, tributyl tin chloride, dibutyl tin dichloride, and 1,3-dimethyl-2-imidazolidinone (DMI). Additionally, compounds such as those defined by formula (III) can be used to provide terminal functionality, regardless of whether a formula (II)-type initiator has been employed.

Reaction of most types of functionalizing compounds with living (anionic) polymers can be performed relatively quickly (a few minutes to a few hours) at moderate temperatures (e.g., 0° to 75° C.).

Quenching can be conducted by stirring the polymer and an active hydrogen-containing compound, such as an alcohol or acid, for up to about 120 minutes at temperatures of from about 25° to about 150° C.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

The resulting polymer can be utilized in a tread stock compound or can be blended with any conventionally employed tread stock rubber including natural rubber and/or non-functionalized synthetic rubbers such as, e.g., one or more of homo-and interpolymers that include just polyene-derived mer units (e.g., poly(butadiene), poly(isoprene), and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to deagglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from about 32 to about 400 $m^2/g$, about 100 to about 250 $m^2/g$, and about 150 to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of about 1 to about 100 parts by weight (pbw) per 100 parts of polymer (phr), preferably in an amount from about 5 to about 80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semireinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical. When carbon black is used with silica, the amount of silica can be decreased to as low as about 1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr.

When silica is employed as a reinforcing filler, addition of a coupling agent such as a silane is customary so as to ensure good mixing in, and interaction with, the elastomer(s). Generally, the amount of silane that is added ranges between about 4 and 20%, based on the weight of silica filler present in the elastomeric compound.

Coupling agents can have a general formula of A-T-X, in which A represents a functional group capable of bonding physically and/or chemically with a group on the surface of the silica filler (e.g., surface silanol groups); T represents a hydrocarbon group linkage; and X represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and A functionalities mentioned above. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful. The additional fillers can be utilized in an amount of up to about 40 phr, typically up to about 20 phr.

Other conventional rubber additives also can be added. These include, for example, process oils, plasticizers, antidegradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene solution (in hexane), styrene (33% in hexane), hexane, n-butyllithium (n-BuLi, 1.60 M in hexane), 2,2-bis(2'-tetrahydrofuryl)propane (1.6 M solution in hexane, stored over $CaH_2$), hexamethyleneimine (HMI, 3.0 M in cyclohexane) and butylated hydroxytoluene (BHT) solution in hexane were used.

Commercially available reagents and starting materials included the following, all of which were used without further purification unless otherwise noted in a specific example:

from Sigma-Aldrich Co. (St. Louis, Mo.)—4-morpholinopiperidine (98% purity), 1-isopropylpiperazine (97% purity), 1-butylpiperazine (97% purity), (S)-(+)-1-(2-pyrrolidinylmethyl)pyrrolidine (96% purity), 1-(2-methylbenzyl)-piperazine (97% purity), 1-(2,4,6-trimethylbenzyl)piperazine, 1-(2-methoxyphenyl)piperazine (98% purity), 1-(3-methoxyphenyl)-piperazine (95% purity), 1-(4-methoxyphenyl)piperazine (97% purity), 1-(2-ethoxyethyl)piperazine (97% purity), 1-(2-methoxyethyl)-piperazine, 1-(2-pyridyl)piperazine (99.5% purity), 1-(1-methyl-4-piperidinyl)-piperazine (98% purity), 1-[2-(dimethylamino)ethyl]piperazine (98% purity), 1-[3-(dimethylamino)propyl]piperazine (98% purity), cyclohexanecarboxaldehyde (98% purity), 1-aminopiperidine, (97% purity), and N,N,N'-trimethyl-1,3-propanediamine (96% purity);

from Alfa Aesar (Ward Hill, Mass.)—1-phenethyl-piperazine (98% purity), 1-(2-dipropylaminoethyl)piperazine, 1-(2-pyrrolidinoethyl)piperazine, 1-piperonyl-piperazine (97% purity), 4-piperidone ethylene ketal (98% purity), N-(4-piperidino)-piperidine (99% purity), and 2-pyrrolidin-2-ylpyridine; and from Acros Organics (Geel, Belgium)—4-(1-pyrrolidinyl) piperidine (99% purity).

Testing data in the Examples was performed on filled compositions made according to the formulations shown in Tables 1a (a formulation employing only silica as a particulate filler) and 1b (a formulation employing only carbon black as a particulate filler). In these tables, N-phenyl-N'-(1,3-dimethylbutyl)-p-phenyldiamine acts as an antioxidant while 2,2'-dithiobisbenzothiazole, N-t-butylbenzothiazole-2-sulfenamide, and N,N'-diphenyl-guanidine act as accelerators.

TABLE 1a

Composition for vulcanizates, silica filler

| | Amount (phr) |
|---|---|
| Masterbatch | |
| synthesized polymer | 80 |
| poly(isoprene) (natural rubber) | 20 |
| silica | 52.5 |
| wax | 2 |
| N-phenyl-N'-(1,3 -dimethylbutyl)-p-phenyldiamine | 0.95 |
| stearic acid | 2 |
| processing oil (low PCA content) | 10 |
| Re-mill | |
| silica | 2.5 |
| silane | 5 |
| Final | |
| sulfur | 1.5 |
| ZnO | 2.5 |
| 2,2'-dithiobisbenzothiazole | 2.0 |
| N-t-butylbenzothiazole-2-sulfenamide | 0.7 |
| N,N'-diphenylguanidine | 0.2 |
| TOTAL | 183.05 |

TABLE 1b

Composition for vulcanizates, carbon black filler

| | Amount (phr) |
|---|---|
| Masterbatch | |
| synthesized polymer | 100 |
| carbon black (N343 type) | 50 |
| wax | 2 |
| N-phenyl-N'-(1,3- dimethylbutyl)-p-phenyldiamine | 0.95 |
| stearic acid | 2 |
| processing oil (low PCA content) | 10 |
| Final | |
| sulfur | 1.5 |
| ZnO | 2.5 |
| 2,2'-dithiobisbenzothiazole | 0.5 |
| N-t-butylbenzothiazole-2-sulfenamide | 0.5 |
| N,N'-diphenylguanidine | 0.3 |
| TOTAL | 170.25 |

Data corresponding to "Dispersion index" (DI) were calculated using the equation $$DI = 100 - \exp[A \times \log_{10}(F^2 H) + B]$$

where F is the number of roughness peaks/cm, H is the average roughness peak height, and A and B are constants from Method B in ASTM-D 2663-89. The F and H contour data were acquired by using a Surfanalyzer™ profilometer (Mahr Federal Inc.; Providence, R.I.) to analyze cut samples (~3.5× 2×0.2 cm), using the procedure described in Method C (from ASTM-D 2663-89).

Data corresponding to "Bound rubber" were determined using the procedure described by J.J. Brennan et al., *Rubber Chem. and Tech.*, 40, 817 (1967).

Mooney viscosity ($ML_{1+4}$) values were determined with an Alpha Technologies™ Mooney viscometer (large rotor) using a one-minute warm-up time and a four-minute running time; tensile mechanical properties were determined using the standard procedure described in ASTM-D412; Payne effect ($\Delta G'$, i.e., the difference between G' at 0.25% strain and at 14% strain) and hysteresis (tan δ) data were obtained from dynamic experiments conducted at 60° C. and 10 Hz (strain sweep) and 2% strain and 10 Hz (temperature sweep). With respect to tensile properties, $M_x$ is modulus at x % elongation, $T_b$ is tensile strength at break, and $E_b$ is percent elongation at break.

Example 1

SBR (Control)

To a $N_2$-purged reactor equipped with a stirrer was added 1.62 kg hexane, 0.41 kg styrene solution, and 2.45 kg butadiene solution (22.2% in hexane). The reactor was charged with 3.0 mL n-BuLi solution, followed by 1.0 mL 2,2-bis(2'-tetrahydrofuryl)propane solution. The reactor jacket was heated to 50° C. and, after ~32 minutes, the batch temperature peaked at ~61° C.

After an additional ~30 minutes, the polymer cement was terminated with isopropanol, coagulated in isopropanol containing BHT, and drum dried.

This polymer is designated sample 1 in Table 2 below.

Example 2

Functionalized SBR (Comparative)

The synthesis procedure from Example 1 was essentially repeated. This time, the batch temperature peaked at ~61° C. after ~26 minutes.

After an additional ~30 minutes, ~4.8 mL APMDEOS (1.0 M in hexane) was added, and the polymer cement was agitated for an additional ~30 minutes at 50° C. Thereafter, the polymer cement was coagulated and dried as in Example 1.

This functionalized polymer is designated sample 2 in Table 2 below.

Example 3

Functionalized SBR (Comparative)

To a $N_2$-purged reactor similar to that employed in Example 1 was added 1.57 kg hexane, 0.41 kg styrene solution, and 2.51 kg butadiene solution (21.7% in hexane). The reactor was charged with 2.9 mL n-BuLi solution, followed by 1.32 mL HMI solution. After ~4 minutes, 1.0 mL 2,2-bis(2'-tetrahydrofuryl)propane solution was added. The reactor jacket was heated to 50° C. and, after ~30 minutes, the batch temperature peaked at ~63° C.

After an additional ~30 minutes, ~4.6 mL APMDEOS solution (as in Example 2) was added, and the polymer cement was agitated for an additional ~30 minutes at 50° C. Thereafter, the polymer cement was coagulated and dried as in Example 1.

This functionalized polymer is designated sample 3 in Table 2 below.

Example 4

Functionalized SBR, 1-[3-(dimethylamino)propyl]piperazine initiator

The synthesis procedure from Example 3 was essentially repeated; however, the initiator component was prepared by adding 2.6 mL n-BuLi solution followed by 3.7 mL 1-[3-(dimethylamino)propyl]piperazine (1.0 M in toluene). After ~4 minutes, 1.0 mL 2,2-bis(2'-tetrahydrofuryl)propane solution was added. The reactor jacket was heated to 50° C. and, after ~35 minutes, the batch temperature peaked at ~63° C.

After an additional ~30 minutes, ~4.2 mL APMDEOS solution (as in Example 2) was added, and the polymer cement was agitated for an additional ~30 minutes at 50° C. Thereafter, the polymer cement was coagulated and dried as in Example 1.

This functionalized polymer is designated sample 4 in Table 2 below.

Example 5

Functionalized SBR, 1-(2,4,6-trimethylbenzyl)piperazine initiator

The synthesis procedure from Example 3 was essentially repeated; however, the initiator component was prepared by adding 2.7 mL n-BuLi solution followed by 3.7 mL 1-(2,4,6-trimethylbenzyl)piperazine (1.0 M in toluene). After ~4 minutes, 1.0 mL 2,2-bis(2'-tetrahydrofuryl)propane solution was added. The reactor jacket was heated to 50° C. and, after ~32 minutes, the batch temperature peaked at 61° C.

After an additional ~30 minutes, ~4.3 mL APMDEOS solution (as in Example 2) was added, and the polymer cement was agitated for an additional ~30 minutes at 50° C. Thereafter, the polymer cement was coagulated and dried as in Example 1.

This functionalized polymer is designated sample 5 below.

Properties of the polymers from Examples 1-5 are summarized below in Table 2, where $M_p$ represents peak molecular weight.

TABLE 2

| | Polymer properties | | | | |
|---|---|---|---|---|---|
| | 1 | 2 | 3 | 4 | 5 |
| $M_n$ (kg/mol) | 141 | 139 | 140 | 148 | 146 |
| $M_p$ | 143 | 146 | 148 | 167 | 157 |
| $M_w/M_n$ | 1.06 | 1.03 | 1.05 | 1.09 | 1.06 |
| $T_g$ (° C.) | −36.7 | −35.4 | −36.9 | −32.7 | −41.1 |
| $ML_{1+4}$ @ 100° C. | 21.6 | 25.6 | 26.6 | 77.2 | 24.6 |

Examples 6-10

Preparation and Testing of Vulcanizates

Using the formulation from Table 1a above, vulcanizable elastomeric compounds containing reinforcing fillers were prepared from samples 1-5. Compounds were cured for ~15 minutes at 171° C. to provide vulcanizates 6-10.

Results of physical testing on vulcanizates made from these polymers are summarized below in Table 3. For the "Temp. sweep" line, the top row of data are from measurements at 0° C. while the bottom row are from measurements at 60° C.

TABLE 3

Compound and vulcanizate properties

|  | 6 | 7 | 8 | 9 | 10 |
|---|---|---|---|---|---|
| synthetic polymer (sample no.) | 1 | 2 | 3 | 4 | 5 |
| DI | 82.0 | 68.0 | 71.6 | 52.2 | 79.2 |
| Bound rubber (%) | 20.8 | 70.3 | 51.1 | 44.0 | 63.7 |
| MDR2000 @ 171° C. (final) | | | | | |
| ML (kg · cm) | 1.96 | 4.10 | 3.83 | 3.58 | 3.57 |
| MH (kg · cm) | 24.88 | 25.64 | 21.19 | 21.81 | 23.31 |
| $t_{90}$ (min) | 6.70 | 7.04 | 6.47 | 6.19 | 6.04 |
| $ML_{1+4}$ @ 100° C. (final) | 45.9 | 84.0 | 81.7 | 102.7 | 94.0 |
| Tensile @ 23° C. (final, unaged) | | | | | |
| $M_{50}$ (MPa) | 2.1 | 1.8 | 1.9 | 2.3 | 1.7 |
| $M_{300}$ (MPa) | 14.2 | 16.2 | 16.3 | 15.9 | 15.7 |
| $T_b$ (MPa) | 15.9 | 17.9 | 17.3 | 15.7 | 16.7 |
| $E_b$ (%) | 328 | 321 | 314 | 293 | 314 |
| Tensile @ 100° C. (final, unaged) | | | | | |
| $M_{50}$ (MPa) | 1.9 | 1.8 | 1.9 | 2.3 | 1.8 |
| $M_{200}$ (MPa) | 7.3 | 3.5 | 8.1 | 4.1 | 8.1 |
| $T_b$ (MPa) | 7.9 | 7.0 | 8.1 | 6.9 | 6.7 |
| $E_b$ (%) | 214 | 174 | 198 | 167 | 173 |
| Strain sweep (60° C., 10 Hz, final) | | | | | |
| G' @ 5% strain (MPa) | 4.440 | 2.684 | 3.030 | 3.522 | 2.573 |
| G" @ 5% strain (MPa) | 0.674 | 0.211 | 0.249 | 0.233 | 0.185 |
| tan δ | 0.1518 | 0.0786 | 0.0822 | 0.0661 | 0.0719 |
| ΔG' (MPa) | 4.951 | 0.771 | 1.145 | 1.374 | 0.628 |
| Temp. sweep (2% strain, 10 Hz, final) | | | | | |
| G' (MPa) | 12.956 | 6.289 | 9.106 | 9.416 | 6.322 |
|  | 6.827 | 3.537 | 4.983 | 5.218 | 3.802 |
| G" (MPa) | 0.674 | 0.211 | 0.249 | 0.233 | 0.185 |
|  | 3.817 | 2.300 | 2.932 | 3.663 | 1.666 |
| tan δ | 0.2945 | 0.3646 | 0.3218 | 0.3884 | 0.2632 |
|  | 0.1236 | 0.0632 | 0.0846 | 0.0619 | 0.0686 |
| Peak tan δ | 0.7634 | 0.9566 | 0.8208 | 0.8130 | 0.9031 |
| $T_g$ (° C.) | −22.9 | −19.9 | −22.4 | −18.5 | −26.6 |

The data of Table 3 indicate, inter alia, that vulcanizates employing styrene/butadiene interpolymers having terminal units derived from a piperazine initiator (Examples 9-10) exhibit, compared to vulcanizates employing similar interpolymers made with a typical alkyllithium initiator (Examples 6-7) or even a known functional initiator (Examples 8), significant reductions in tan δ at 60° C.

Example 11

SBR (Control)

The synthesis procedure from Example 1 was repeated. This polymer is designated sample 11 in Table 4 below.

Examples 12-13

SBR (Control) and Functionalized SBR (Comparative)

The synthesis procedure from Example 3 was essentially repeated; however, the initiator component was prepared by adding 3.2 mL n-BuLi solution followed by 1.54 mL HMI solution. After ~29 minutes, the batch temperature peaked at ~61° C.

After an additional ~30 minutes, portions of the polymer cement were transferred to dried glass bottles. To one (sample 12) was added isopropanol, and to the other (sample 13) was added SnCl₄ (0.25 M in hexane, enough to provide an ~1:1 ratio relative to calculated amount of Li atoms); both were agitated for an additional ~30 minutes at ~50° C. Thereafter, the polymer cements were coagulated and dried as in Example 1.

Properties of these polymers are shown below in Table 4.

Examples 14-15

Functionalized SBR,
1-[3-(dimethylamino)propyl]piperazine initiator

The synthesis procedure from Examples 12-13 was essentially repeated; however, the initiator component was prepared by adding 3.2 mL n-BuLi solution followed by 5.0 mL 1-[3-(dimethylamino)propyl]piperazine (1.0 M in toluene). After ~4 minutes, 1.0 mL 2,2-bis(2'-tetrahydrofuryl)propane solution was added. The reactor jacket was heated to 50° C. and, after ~34 minutes, the batch temperature peaked at ~63° C.

Portions of the polymer cement were treated identically to those from Examples 12-13. These are identified as samples 14 (terminated with isopropanol) and 15 (terminated with SnCl₄) in Table 4 below.

Properties of the polymers from Examples 11-15 are summarized in Table 4.

TABLE 4

Polymer properties

|  | 11 | 12 | 13 | 14 | 15 |
|---|---|---|---|---|---|
| $M_n$ (kg/mol) | 141 | 128 | 300 | 140 | 340 |
| $M_p$ | 143 | 132 | 428 | 159 | 592 |
| $M_w/M_n$ | 1.06 | 1.05 | 1.29 | 1.09 | 1.38 |
| $T_g$ (° C.) | −36.7 | −37.9 | −38.1 | −32.8 | −33.7 |
| $ML_{1+4}$ @ 100° C. | 21.6 | 18.0 | 94.8 | 47.8 | 125.9 |

Examples 16-20

Preparation and Testing of Vulcanizates

Using the formulation from Table 1b above, vulcanizable elastomeric compounds containing reinforcing fillers were prepared from samples 11-15. Compounds were cured for ~15 minutes at 171° C. to provide vulcanizates 16-20.

Results of physical testing on vulcanizates made from these polymers are summarized below in Table 5. For the "Temp. sweep" line, the top row of data are from measurements at 0° C. while the bottom row are from measurements at 60° C.

TABLE 5

Compound and vulcanizate properties

|  | 16 | 17 | 18 | 19 | 20 |
|---|---|---|---|---|---|
| synthetic polymer (sample no.) | 11 | 12 | 13 | 14 | 15 |
| DI | 96.6 | 94.9 | 92.8 | 95.2 | 93.3 |
| Bound rubber (%) | 11.3 | 27.4 | 49.2 | 23.9 | 36.9 |
| MDR2000 @ 171° C. (final) | | | | | |
| ML (kg · cm) | 1.02 | 1.34 | 2.66 | 1.79 | 2.83 |
| MH (kg · cm) | 17.86 | 19.23 | 16.90 | 18.55 | 17.48 |
| $t_{90}$ (min) | 6.04 | 3.84 | 5.60 | 6.89 | 7.22 |
| $ML_{1+4}$ @ 100° C. (final) | 54.5 | 67.7 | 113.1 | 103.4 | 128.7 |
| Tensile @ 23° C. (final, unaged) | | | | | |
| $M_{50}$ (MPa) | 1.86 | 1.40 | 1.64 | 1.89 | 1.72 |
| $M_{300}$ (MPa) | 13.20 | 12.39 | 17.45 | 15.64 | 17.36 |
| $T_b$ (MPa) | 19.80 | 24.96 | 20.30 | 20.20 | 19.20 |
| $E_b$ (%) | 428 | 367 | 338 | 373 | 330 |
| Tensile @ 100° C. (final, unaged) | | | | | |
| $M_{50}$ (MPa) | 1.58 | 1.03 | 1.48 | 1.66 | 1.58 |
| $M_{200}$ (MPa) | 6.94 | 5.38 | 8.35 | 8.13 | 8.51 |
| $T_b$ (MPa) | 9.20 | 6.17 | 10.60 | 9.50 | 11.40 |
| $E_b$ (%) | 252 | 228 | 233 | 224 | 245 |
| Strain sweep (60° C., 10 Hz, final) | | | | | |
| G' @ 5% strain (MPa) | 2.789 | 2.525 | 2.173 | 2.187 | 1.995 |
| G" @ 5% strain (MPa) | 0.592 | 0.442 | 0.219 | 0.313 | 0.214 |
| tan δ | 0.2122 | 0.1751 | 0.1006 | 0.1432 | 0.1071 |
| ΔG' (MPa) | 3.399 | 1.782 | 0.670 | 1.211 | 0.680 |
| Temp. sweep (2% strain, 10 Hz, final) | | | | | |
| G' (MPa) | 14.542 | 19.535 | 8.279 | 14.919 | 12.111 |
|  | 5.823 | 5.215 | 3.867 | 5.432 | 4.317 |
| G" (MPa) | 5.487 | 4.185 | 3.235 | 7.174 | 6.204 |
|  | 1.151 | 1.184 | 0.385 | 0.876 | 0.526 |
| tan δ | 0.3742 | 0.2146 | 0.3905 | 0.4741 | 0.5042 |
|  | 0.1977 | 0.2269 | 0.0996 | 0.1612 | 0.1218 |
| Peak tan δ | 0.7933 | 0.7872 | 0.9976 | 0.8281 | 0.8921 |
| $T_g$ (° C.) | −23.0 | −25.3 | −21.6 | −18.5 | −18.0 |

Examples 21-27

A control SBR was prepared using a process similar to that set forth in Example 1. This is designated as sample 21 below.

A functionalized SBR was prepared using a process similar to those set forth in Examples 4 and 14. This is designated as sample 22 below.

A functionalized SBR was prepared using a process similar to that set forth in Example 5. This is designated as sample 23 below.

Three additional functionalized SBR interpolymers were prepared using solution polymerization techniques similar to those described above. These used lithiated versions of 1-isopropylpiperazine, 1-butylpiperazine and 4-(1-pyrrolidinyl) piperidine as initiators, and are designated as samples 24-26, respectively, below.

A portion of the SBR made using lithiated 4-(1-pyrrolidinyl)piperidine as an initiator was reacted, prior to quenching, with a compound having the formula

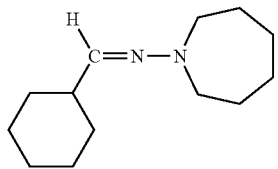

This bifunctional polymer is designated as sample 27 below.

The $M_n$ for each of samples 21-27 is provided below in Table 6.

TABLE 6

| Number average molecular weights | | | | | | | |
|---|---|---|---|---|---|---|---|
| | 21 | 22 | 23 | 24 | 25 | 26 | 27 |
| $M_n$ (kg/mol) | 140 | 140 | 149 | 157 | 147 | 139 | 128 |

Examples 28-34

Preparation and Testing of Vulcanizates

Using the formulation from Table 1b above, vulcanizable elastomeric compounds containing reinforcing fillers were prepared from samples 21-27. These compounds were cured for ~15 minutes at 171° C. to provide vulcanizates 28-34.

Results of physical testing on these vulcanizates are summarized below in Table 7. For the "Temp. sweep" line, the top row of data are from measurements at 0° C. while the bottom row are from measurements at 60° C.

TABLE 7

| | Compound and vulcanizate properties | | | | | | |
|---|---|---|---|---|---|---|---|
| | 28 | 29 | 30 | 31 | 32 | 33 | 34 |
| synthetic polymer (sample no.) | 21 | 22 | 23 | 24 | 25 | 26 | 27 |
| DI | 97 | 93 | 94 | 97 | 94 | 95 | 94 |
| Bound rubber (%) | 11.3 | 23.9 | 17.5 | 16.3 | 21.6 | 27.6 | 36.9 |
| MDR2000 @ 171° C. (final) | | | | | | | |
| ML (kg · cm) | 1.02 | 1.79 | 1.19 | 1.30 | 2.06 | 1.39 | 1.81 |
| MH (kg · cm) | 18.21 | 18.55 | 18.77 | 18.27 | 18.98 | 18.12 | 17.31 |
| $t_{90}$ (min) | 5.82 | 6.89 | 6.37 | 6.59 | 7.18 | 5.91 | 7.24 |
| $ML_{1+4}$ @ 100° C. (final) | 56.0 | 103.4 | 63.4 | 76.1 | 109.2 | 79.8 | 90.3 |
| Tensile @ 23° C. (final, unaged) | | | | | | | |
| $M_{50}$ (MPa) | 1.91 | 1.89 | 1.92 | 1.90 | 1.90 | 1.88 | 1.74 |
| $M_{300}$ (MPa) | 13.37 | 15.64 | 14.27 | 14.55 | 15.45 | 16.01 | 16.27 |
| $T_b$ (MPa) | 19.3 | 20.2 | 20.9 | 17.2 | 20.7 | 22.3 | 19.8 |
| $E_b$ (%) | 420 | 373 | 421 | 348 | 390 | 399 | 348 |
| Tensile @ 100° C. (final, unaged) | | | | | | | |
| $M_{50}$ (MPa) | 1.54 | 1.66 | 1.63 | 1.56 | 1.65 | 1.61 | 1.58 |
| $M_{200}$ (MPa) | 6.94 | 8.13 | 7.34 | 7.47 | 8.37 | 8.02 | 8.35 |
| $T_b$ (MPa) | 8.4 | 9.5 | 9.3 | 8.5 | 10.0 | 9.8 | 8.9 |
| $E_b$ (%) | 232 | 224 | 237 | 221 | 229 | 231 | 208 |
| Strain sweep (60° C., 10 Hz, final) | | | | | | | |
| G' @ 5% strain (MPa) | 2.622 | 2.187 | 2.650 | 2.553 | 2.456 | 2.139 | 2.084 |
| G" @ 5% strain (MPa) | 0.536 | 0.313 | 0.506 | 0.458 | 0.415 | 0.236 | 0.193 |
| tan δ | 0.2043 | 0.1432 | 0.1910 | 0.1795 | 0.1690 | 0.1105 | 0.0927 |
| ΔG' (MPa) | 2.640 | 1.211 | 2.534 | 2.124 | 1.901 | 0.686 | 0.530 |
| Temp. sweep (2% strain, 10 Hz, final) | | | | | | | |
| G' (MPa) | 14.060 | 14.919 | 13.456 | 14.348 | 14.661 | 12.489 | 8.980 |
| | 5.545 | 5.432 | 5.719 | 5.155 | 4.859 | 5.072 | 3.803 |
| G" (MPa) | 5.496 | 7.174 | 4.559 | 6.661 | 7.493 | 4.898 | 3.771 |
| | 1.177 | 0.876 | 1.095 | 1.059 | 0.934 | 0.744 | 0.479 |
| tan δ | 0.3908 | 0.4741 | 0.3387 | 0.4641 | 0.5110 | 0.3882 | 0.4195 |
| | 0.2122 | 0.1612 | 0.1914 | 0.2054 | 0.1922 | 0.1466 | 0.1258 |
| Peak tan δ | 0.8367 | 0.9085 | 0.8298 | 0.8541 | 0.8643 | 0.9566 | 0.9312 |
| $T_g$ (° C.) | −21.8 | −22.1 | −25.4 | −19.0 | −17.0 | −19.9 | −21.2 |

Example 35

Preparation of Cyclohexanecarboxaldehyde Piperidine Hydrazone

To ~50 mL pyridine were added ~7.4 mL cyclohexanecarboxaldehyde and ~6.5 mL 1-aminopiperidine, and the solution was stirred at room temperature for ~12 hours. Pyridine was removed under vacuum distillation, and the residue was purified by silica gel column chromatography (eluted with a 10:90 mixture of diethyl ether and hexane) to yield ~11.6 g (98% yield) of a colorless oil product. The identity of the product as cyclohexane-carboxaldehyde piperidine hydrazone was confirmed by $^1$H and $^{13}$C NMR.

Example 36-37

SBR (Control) and Functionalized SBR (Comparative)

To a $N_2$-purged reactor equipped with a stirrer was added 1.61 kg hexane, 0.41 kg styrene solution, and 2.46 kg butadiene solution (22.1% in hexane). The reactor was charged with 3.1 mL n-BuLi solution, followed by 1.0 mL 2,2-bis(2'-tetrahydrofuryl)propane solution. The reactor jacket was heated to 50° C. and, after ~26 minutes, the batch temperature peaked at ~66° C.

After an additional ~30 minutes, portions of the polymer cement were transferred to glass bottles. One portion was terminated with isopropanol, coagulated in isopropanol containing BHT, and drum dried; this polymer is designated sample 36 in Table 8 below. Another portion was reacted with carboxaldehyde piperidine hydrazone from Example 35 (1.0 M in hexane) for ~30 minutes at 50° C. before being coagulated in isopropanol containing BHT and drum dried; this is designated as sample 37 in Table 8 below.

Examples 38-39

Functionalized SBR, 4-(1-pyrrolidinyl)piperidine initiator

The synthesis procedure from Examples 36-37 was essentially repeated; however, the initiator component was prepared by adding 3.6 mL n-BuLi solution followed by 3.7 mL 4-(1-pyrrolidinyl)piperidine (1.3 M in toluene). After ~4 minutes, 1.0 mL 2,2-bis(2'-tetrahydrofuryl)propane solution was added. The reactor jacket was heated to 50° C. and, after ~28 minutes, the batch temperature peaked at ~63° C.

Portions of the polymer cement were treated identically to those from Examples 36-37. These are identified as samples 38 (terminated with isopropanol) and 39 (terminated with carboxaldehyde piperidine hydrazone in Table 8 below.

Properties of the polymers from Examples 36-39 are summarized in Table 8.

TABLE 8

| Polymer properties | | | | |
|---|---|---|---|---|
| | 36 | 37 | 38 | 39 |
| $M_n$ (kg/mol) | 131 | 126 | 106 | 108 |
| $M_p$ | 138 | 137 | 117 | 119 |
| $M_w/M_n$ | 1.06 | 1.05 | 1.08 | 1.09 |
| $T_g$ (° C.) | −35.9 | −35.9 | −38.0 | −39.3 |

Examples 40-43

Preparation and Testing of Vulcanizates

Using the formulation from Table 1b above, vulcanizable elastomeric compounds containing reinforcing fillers were prepared from samples 36-39. Compounds were cured for ~15 minutes at 171° C. to provide vulcanizates 40-43, respectively.

Results of physical testing on vulcanizates made from these polymers are summarized below in Table 9.

TABLE 9

| Compound and vulcanizate properties | | | | |
|---|---|---|---|---|
| | 40 | 41 | 42 | 43 |
| Bound rubber (%) | 13.9 | 36.5 | 17.9 | 41.3 |
| 171° C. MDR $t_{50}$ (min) | 2.73 | 1.92 | 2.38 | 1.70 |
| 171° C. MH-ML (kg · cm) | 19.8 | 16.7 | 18.9 | 17.1 |
| $ML_{1+4}$ @ 130° C. | 32.0 | 52.2 | 39.2 | 70.1 |
| 300% modulus @ 23° C. (MPa) | 13.21 | 14.59 | 12.27 | 14.00 |
| Tensile strength @ 23° C. (MPa) | 15.49 | 22.79 | 18.21 | 19.60 |
| Temp. sweep 0° C. tan δ | 0.2276 | 0.2790 | 0.1981 | 0.2286 |
| Temp. sweep 50° C. tan δ | 0.2584 | 0.1595 | 0.2040 | 0.1229 |
| RDA 0.25-14% ΔG' (MPa) | 3.885 | 0.584 | 1.668 | 0.585 |
| 50° C. RDA strain sweep (5% strain) tan δ | 0.2196 | 0.1030 | 0.1623 | 0.0869 |
| 50° C. Dynastat tan δ | 0.2062 | 0.1060 | 0.1371 | 0.0840 |

That which is claimed is:

1. A polymer comprising a terminal moiety defined by the formula

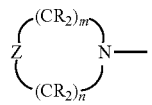

where
  each R independently is H or a $C_1$-$C_6$ alkyl group;
  m is an integer of from 0 to 4 inclusive and n is an integer of from 1 to 4 inclusive, with the proviso that m+n≧2; and
  Z is $NR^1$, $PR^2$, $SiR^2R^3$, $SnR^2R^3$, or $CR^2R^4$ wherein
    each of $R^1$ and $R^2$ is an alkyl, aryl, aralkyl, alkaryl or cycloalkyl group that is free of active hydrogen atoms and that comprises one or more N, P, O, S, Si or Sn atoms,
    $R^3$ is a $C_1$-$C_6$ alkyl group, and
    $R^4$ is R or, together with $R^2$ and the C atom to which it is bonded, forms a cycloalkyl group that includes at least one N, P, O, S, Si or Sn atom.

2. The polymer of claim 1 wherein said polymer comprises a second terminal functionality.

3. A method of providing a polymer that comprises terminal functionality, said method comprising initiating polymerization of one or more types of ethylenically unsaturated monomers with an initiator having the general formula

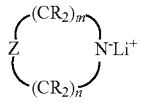

where
each R independently is H or a $C_1$-$C_6$ alkyl group;
m is an integer of from 0 to 4 inclusive and n is an integer of from 1 to 4 inclusive, with the proviso that m+n≧2; and
Z is $NR^1$, $PR^2$, $SiR^2R^3$, $SnR^2R^3$, or $CR^2R^4$ wherein
each of $R^1$ and $R^2$ is an alkyl, aryl, aralkyl, alkaryl or cycloalkyl group that is free of active hydrogen atoms and that comprises one or more N, P, O, S, Si or Sn atoms,
$R^3$ is a $C_1$-$C_6$ alkyl group, and
$R^4$ is R or, together with $R^2$ and the C atom to which it is bonded, forms a cycloalkyl group that includes at least one N, P, O, S, Si or Sn atom, so as to provide a living polymer that comprises terminal functionality.

4. The method of claim 3 further comprising providing said initiator by reacting an alkyllithium with a cyclic compound having the general formula

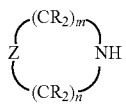

where Z, R, m, and n are defined as before.

5. The method of claim 4 wherein said cyclic compound has the general formula

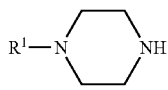

where $R^1$ is an alkyl, aryl, aralkyl, alkaryl or cycloalkyl group that is free of active hydrogen atoms and that comprises one or more N, P, O, S, Si or Sn atoms.

6. The method of claim 5 wherein $R^1$ is an alkyl group that is free of active hydrogen atoms and that comprises one or more N, P, O, S, Si or Sn atoms.

7. The method of claim 6 wherein $R^1$ is a $C_1$-$C_{10}$ alkoxyalkyl group.

8. The method of claim 6 wherein $R^1$ is a $C_1$-$C_{10}$ aminoalkyl group.

9. The method of claim 3 further comprising reacting said living polymer with a functionalizing compound so as to provide additional terminal functionality to said polymer.

10. The method of claim 4 wherein said cyclic compound is defined by either of the general formulas

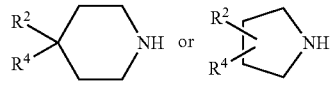

where $R^2$ and $R^4$ are defined as before.

11. The method of claim 10 wherein $R^4$ is R.

12. The method of claim 11 wherein $R^2$ is an aryl or cycloalkyl group that is free of active hydrogen atoms and that comprises one or more N, P, O, S, Si or Sn atoms.

13. The method of claim 11 wherein $R^2$ is an alkyl group that is free of active hydrogen atoms and that comprises at least one O or Si atom.

14. The method of claim 10 wherein $R^4$ and $R^2$, together with the C atom to which both are bonded, form a cycloalkyl group that includes at least one N, P, O, S, Si or Sn atom.

15. A method of providing a polymer that comprises terminal functionality, said method comprising initiating polymerization of one or more types of ethylenically unsaturated monomers with an initiator having the general formula

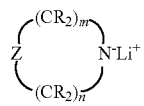

where each R independently is H or a $C_1$-$C_6$ alkyl group; m is an integer of from 0 to 4 inclusive and n is an integer of from 1 to 4 inclusive, with the proviso that m+n≧2; and Z is $NR^1$ where $R^1$ is a cyclo-alkyl group that comprises a heteroatom in its ring structure and is free of active hydrogen atoms so as to provide a living polymer that comprises terminal functionality.

16. The method of claim 15 wherein each R is H, m is 2 and n is 2.

17. The method of claim 16 further comprising reacting said living polymer with a functionalizing compound so as to provide additional terminal functionality.

18. The method of claim 15 further comprising reacting said living polymer with a functionalizing compound so as to provide additional terminal functionality.

* * * * *